(12) United States Patent
Full et al.

(10) Patent No.: US 11,932,113 B2
(45) Date of Patent: Mar. 19, 2024

(54) DRIVE DEVICE OF A HYBRID DRIVE

(71) Applicant: Bayerische Motoren Werke Aktiengesellschaft, Munich (DE)

(72) Inventors: Otmar Full, Munich (DE); Werner Pfau, Augsburg (DE); Michael Staake, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/635,098

(22) PCT Filed: Aug. 4, 2020

(86) PCT No.: PCT/EP2020/071891
§ 371 (c)(1),
(2) Date: Feb. 14, 2022

(87) PCT Pub. No.: WO2021/052670
PCT Pub. Date: Mar. 25, 2021

(65) Prior Publication Data
US 2022/0289014 A1    Sep. 15, 2022

(30) Foreign Application Priority Data
Sep. 18, 2019 (DE) ............... 10 2019 125 050.1

(51) Int. Cl.
*F16H 3/00* (2006.01)
*B60K 6/36* (2007.10)
(Continued)

(52) U.S. Cl.
CPC ............... *B60K 6/48* (2013.01); *B60K 6/36* (2013.01); *B60K 6/387* (2013.01); *B60K 2006/4825* (2013.01)

(58) Field of Classification Search
CPC . B60K 6/48; B60K 6/36; B60K 6/387; B60K 2006/4825; F16H 3/006
(Continued)

(56) References Cited

U.S. PATENT DOCUMENTS 4,667,540 A * 5/1987 Yagi ............... F16H 61/061
                                                   477/154
4,711,138 A * 12/1987 Miura ............... F16H 3/64
                                                   475/143
(Continued)

FOREIGN PATENT DOCUMENTS

CN         1980806 A      6/2007
CN       101918237 A     12/2010
(Continued)

OTHER PUBLICATIONS

International Search Report (PCT/ISA/210) issued in PCT Application No. PCT/EP2020/071891 dated Oct. 23, 2020 with English translation (five (5) pages).
(Continued)

*Primary Examiner* — Ha Dinh Ho
(74) *Attorney, Agent, or Firm* — Crowell & Moring LLP

(57) ABSTRACT

A drive device has an internal combustion engine connection configured for receiving driving power from an internal combustion engine and has an electric motor generator configured for outputting driving power to an electric motor generator connection. A coupling device is configured for coupling both the internal combustion engine connection and the electric motor generator connection to at least one power train connection that is configured for outputting driving power to a power train. The coupling device has a radially outer drive part and a coupling portion lying radially within the drive part, which coupling portion is configured for selectively connecting the drive part to the power train connection in a rotationally fixed manner. A power trans-
(Continued)

mission portion is arranged on an outer circumferential surface on the radially outer drive part, which power transmission portion is configured for receiving driving power from the electric motor generator. Both the internal combustion engine connection and the electric motor generator connection are arranged concentrically to a main drive axis. The power transmission portion partially or fully covers the coupling portion in the longitudinal direction of the main drive axis. An electric motor axis, about which an electric motor shaft configured for outputting driving power from the electric motor generator is provided, which electric motor axis is arranged axially parallel to and radially spaced from the main drive axis.

6 Claims, 1 Drawing Sheet

(51) Int. Cl.
    *B60K 6/387*     (2007.10)
    *B60K 6/48*     (2007.10)

(58) Field of Classification Search
    USPC .................................................. 74/661, 330
    See application file for complete search history.

(56) References Cited

U.S. PATENT DOCUMENTS

| | | | |
|---|---|---|---|
| 6,471,026 B1* | 10/2002 | Kundermann | F16D 25/14 |
| | | | 192/48.618 |
| 6,491,149 B1* | 12/2002 | Kundermann | F16D 25/0638 |
| | | | 192/85.33 |
| 6,523,657 B1* | 2/2003 | Kundermann | F16D 25/0638 |
| | | | 192/85.33 |
| 2002/0082134 A1 | 6/2002 | Hirt et al. | |
| 2004/0035666 A1* | 2/2004 | Grosspietsch | F16D 25/10 |
| | | | 192/48.8 |
| 2008/0015085 A1 | 1/2008 | Chapelon et al. | |
| 2009/0223769 A1* | 9/2009 | Nohl | F16D 25/0638 |
| | | | 192/48.8 |
| 2019/0344656 A1 | 11/2019 | Obergasser et al. | |

FOREIGN PATENT DOCUMENTS

| | | |
|---|---|---|
| CN | 107667028 A | 2/2018 |
| CN | 108290490 A | 7/2018 |
| CN | 109789760 A | 5/2019 |
| DE | 43 11 697 A1 | 10/1994 |
| DE | 10 2015 225 422 A1 | 6/2017 |
| DE | 10 2016 218 264 A1 | 3/2018 |
| DE | 10 2017 112 712 A1 | 12/2018 |
| FR | 2 871 110 A1 | 12/2005 |
| FR | 3 060 682 A1 | 6/2018 |

OTHER PUBLICATIONS

German-language Written Opinion (PCT/ISA/237) issued in PCT Application No. PCT/EP2020/071891 dated Oct. 23, 2020 (five (5) pages).

German-language Search Report issued in German Application No. 10 2019 125 050.1 dated May 19, 2020 with partial English translation (10 pages).

Chinese-language Office Action issued in Chinese Application No. 202080051969.5 dated Dec. 13, 2023 with English translation (16 pages).

\* cited by examiner

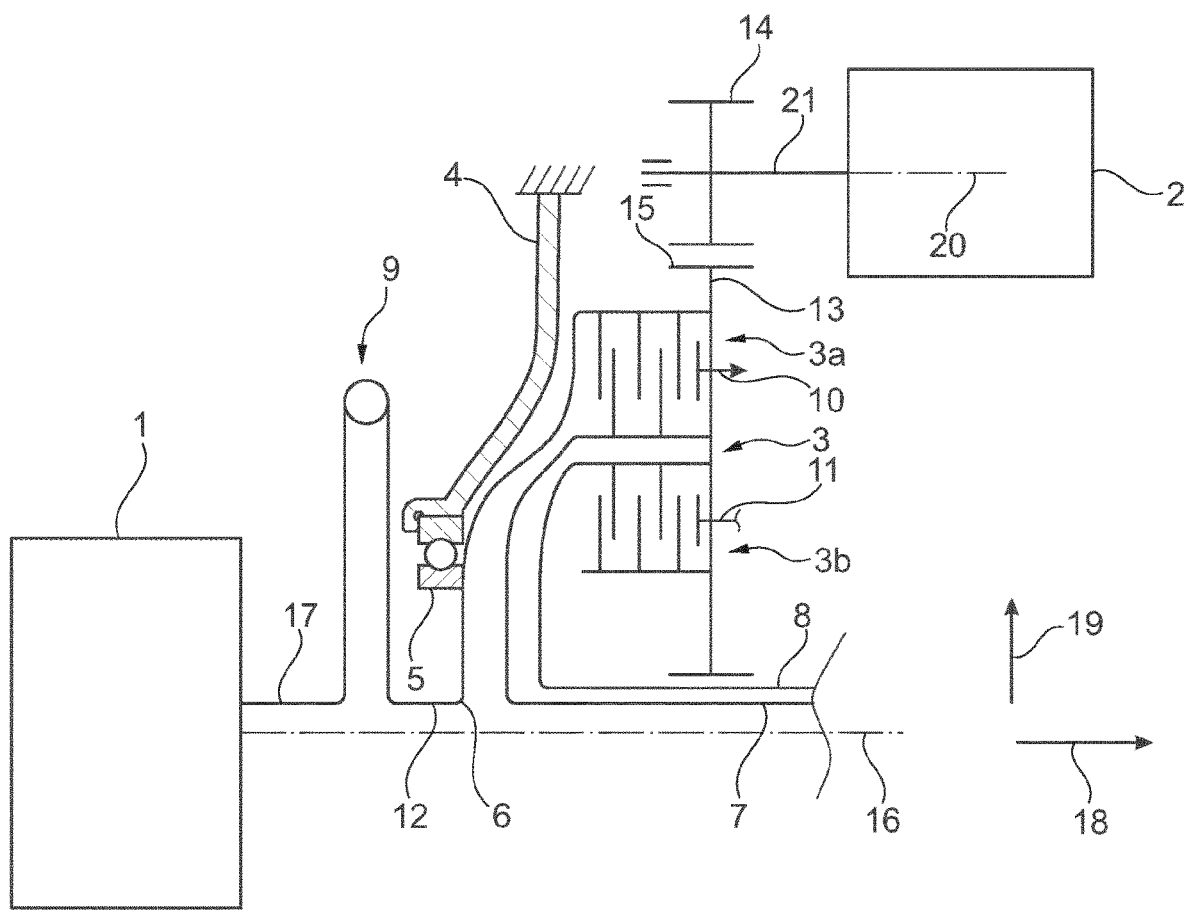

DRIVE DEVICE OF A HYBRID DRIVE

BACKGROUND AND SUMMARY OF THE INVENTION

The invention concerns a gear arrangement of a hybrid drive for a motor vehicle.

In principle, a hybrid drive is known from the prior art. DE 43 11 697 A1 discloses a hybrid arrangement for a motor vehicle with an internal combustion engine and an electromechanical energy converter, which may be used alone or jointly for driving a motor vehicle.

In contrast to purely electric or purely combustion-engine drive, in a hybrid drive having two different types of drive machines, the installation space required is increased; in particular, also this larger space requirement is further increased by the gear mechanisms which are frequently necessary for coupling the two drive machines. It is an object of the invention to indicate a drive device of a hybrid drive which requires little installation space. This object is achieved by the subject of claim 1, and preferred embodiments are the subject of the dependent claims.

According to a basic concept of the invention, the drive device has an internal combustion engine connection. This internal combustion engine connection is designed for receiving drive power from an internal combustion engine. In the context of the invention, an internal combustion engine means a thermal engine with internal combustion, and preferably an internal combustion engine in reciprocating piston design.

The drive power of the internal combustion engine can be transmitted to the internal combustion engine connection in the form of rotation speed and torque (mechanical power), preferably starting from a so-called crankshaft of the internal combustion engine. Preferably, the crankshaft is coupled directly to the internal combustion engine connection, and preferably a device for reducing torsional vibrations is coupled between the internal combustion engine connection and the crankshaft, relative to the transmission of drive power. Such devices are known from the prior art in widely varying designs, in particular as single-mass or multi-mass flywheels, or as active or passive torsional vibration dampers or similar, wherein the invention is not restricted to a specific form of such a device. Further preferably, the crankshaft of the internal combustion engine and the internal combustion engine connection are arranged coaxially to one another. In the sense of the invention, the internal combustion engine connection may be a shaft portion or a shaft component, wherein this component is mounted so as to be rotatable about an axis during planned operation. Preferably, during this transmission of drive power, no conversion thereof takes place, in particular not by a gear mechanism or similar; rather, the crankshaft of the internal combustion engine—and hence the internal combustion engine itself—is coupled directly and preferably permanently to the internal combustion engine connection.

Furthermore, the drive device has an electric motor generator which is designed for delivering drive power to an electric motor generator connection. In the sense of the invention, an electric motor generator means an electromechanical energy converter which is designed for delivering or receiving mechanical power (rotation speed, torque). Furthermore, such an electromechanical energy converter can be operated with electrical power (voltage, current). Furthermore, the electric motor generator is preferably also designed for receiving drive power from the electric motor connection, wherein said drive power can preferably be supplied to an on-board network of the motor vehicle and preferably be stored partially or completely in an electrochemical energy accumulator. By means of the electric motor generator, it is possible to provide a plurality of operating modes and a particularly efficient drive of the motor vehicle.

Furthermore, the drive device has a coupling device which is designed for selectively coupling and decoupling both the internal combustion engine connection and also the electric motor generator connection to and from at least one power train connection. In the sense of the invention, a power train connection is a shaft portion or a shaft component which is mounted so as to be rotatable about an axis during planned operation and is designed for transmitting mechanical power. In the sense of the invention, a coupling device is an in particular friction-type clutch or a torque converter, wherein also a torque converter may additionally comprise a friction-type or positive-locking clutch or friction-type positive-locking clutch (so-called torque lock-up clutch). Further preferably, the power train connection is or may be coupled to the drive train of a motor vehicle. Preferably, the power train connection is or may be coupled to a gearbox input shaft of a gear mechanism, preferably a speed change gear mechanism.

The power train connection is thus designed for delivering drive power to a power train, in particular in the direction of a driven axle of a motor vehicle, or at least in the direction of a drive wheel of a motor vehicle.

Furthermore, the coupling device has a radially outer drive part and a coupling portion which lies radially inside the drive part and is designed for selectively connecting the drive part to the at least one power train connection in a rotationally fixed fashion. Figuratively speaking, in the case of a closed coupling device, drive power can be transmitted from the drive part to the power train connection. Furthermore preferably, the coupling portion is the geometric region of the coupling device containing the components provided for the selective transmission of the drive power; in the case of a friction clutch, this is the region in which the friction plate or friction plates are arranged, or in the case of a torque converter, the region in which the turbine wheel and pump wheel are arranged.

Preferably, the drive part of the coupling device is the component to which the drive power of both the internal combustion engine and also the electric motor generator can be transmitted, and which is arranged upstream of the coupling portion in the direction of power transmission from the internal combustion engine connection to the power train connection. Further preferably, the drive part is a shaft or shaft component, preferably a hollow shaft. Furthermore, on an outer circumferential surface, the drive part has a power transmission portion. The power transmission portion is the geometric region of the drive part which is designed for receiving drive power from the electric motor generator, or for delivering drive power in the direction of the electric motor generator. In the case that the power transmission portion is configured as a gear wheel, in particular the longitudinal extent of this power transmission portion means the active gear wheel width of this gear wheel, since this is directly involved in the transmission of power from the electric motor generator.

As explained, both the internal combustion engine connection and the electric motor generator connection are rotatable in planned operation for transmission of drive power, and arranged concentrically to one another and hence concentrically to a main drive axis.

The power transmission portion at least partially or completely covers the coupling portion of the coupling device in the longitudinal direction of said main drive axis. Preferably, the power transmission portion is arranged inside the coupling portion in this longitudinal direction. In particular, with such a geometric nested arrangement, a small installation space requirement in the axial direction (longitudinal direction of main drive axis) can be achieved.

Furthermore, an electric motor axis, about which an electric motor shaft rotates which is designed for delivering or receiving drive power to or from the electric motor generator, is arranged axially parallel to and radially spaced from the main drive axis. In particular with such a design of the drive device, it is possible to arrange the electromechanical energy converter (electric motor generator) geometrically next to the coupling device. Furthermore, in power transmission from or to the electric motor generator, it is possible to provide a translation ratio different from 1:1, preferably a speed reduction translation from the electric motor generator to the drive part, and thus use an electric motor generator with a particularly compact design. This should be regarded in particular as contrasting to an electric motor generator which is arranged concentrically to the main drive axis, extends in a ring around the main drive axis and requires more installation space than the proposed solution.

In a preferred embodiment of the invention, the coupling device is formed as a dual clutch. A dual clutch comprises, as well as the described power train connection, a further power train connection, since in particular two partial gear mechanisms can be controlled by means of such a dual clutch, and hence two power train connections are advantageous. Furthermore, the dual clutch has a radially outer first partial clutch and a second partial clutch arranged radially inside the first partial clutch. By means of these two partial clutches, selectively drive power can be transmitted from the drive part to the power train connection or the further power train connection. A dual clutch, or dual-clutch transmission, is known as such from the prior art. In order to provide the functionality of selective control of two power train connections, the first partial clutch is designed for selectively connecting the drive part to the above-mentioned power train connection in a rotationally fixed fashion, and the second partial clutch is designed for selectively connecting the drive part to the further power train connection in a rotationally fixed fashion. In particular, a so-called dual-clutch transmission can advantageously be controlled by means of a dual clutch, wherein such a dual-clutch transmission allows an efficient and in particular also comfortable drive of a motor vehicle.

In a preferred embodiment, the first partial clutch partially or completely covers the second partial clutch in the longitudinal direction of the main drive axis. In particular, with such an arrangement, a small axial installation space requirement can be achieved.

In a preferred embodiment of the invention, the coupling device is configured not as a dual clutch but as a torque converter. Torque converters are hydrodynamic devices and are known from the prior art in combination with so-called automatic transmissions. Furthermore, for transmitting torque, such a torque converter comprises a pump wheel, a turbine wheel and usually also a guide wheel. Preferably, the torque converter additionally comprises a friction-type or positive-locking clutch, known as a torque lock-up clutch. Here, the torque converter is designed for transmitting drive power from the drive part, i.e. from the internal combustion engine and/or the electric motor generator, to the at least one power train connection.

In a preferred embodiment of the invention, the power transmission portion is configured as a gear wheel. Here, said gear wheel may be geometrically described as a ring gear. This gear wheel is configured for receiving power from the electric motor generator which has an electric motor pinion for transmitting drive power. Advantageously, the gear wheel has a relatively large diameter in comparison with the electric motor pinion, so that a speed reduction translation from the electric motor generator to the drive part is achieved. In particular, with such a design, an electric motor generator can be operated with lower current levels compared with an electric motor generator with a translation ratio of 1:1, as would be the case in particular if the electric motor generator were arranged concentrically to the main drive axis. In particular, with a gear wheel mechanism, high drive power levels can be transmitted with high efficiency, and hence an efficient drive can be achieved in a small installation space.

In a preferred embodiment of the invention, the power transmission portion is configured as a traction means wheel, and in particular an endless traction means is provided for receiving power from the electric motor generator and transmitting the drive power to this traction means wheel. Preferably, in this embodiment, the traction means wheel is configured as a chain sprocket and the endless traction means as a chain. Different types of chains are known from the prior art, wherein the invention is not restricted to a specific type of chain. In particular, in comparison with gear wheels, chains are suitable for overcoming larger axial spacings with small installation space requirement. In a further preferred embodiment of the drive device with the endless traction means, the traction means wheel is configured as a belt pulley and the endless traction means as a belt. As with chains, in the case of belts too different types of belts and corresponding pulleys are known, wherein the invention is not restricted to a specific type of belt as an endless traction means.

An embodiment of the invention and individual features thereof are described below with reference to the partially schematic FIGURE.

BRIEF DESCRIPTION OF THE DRAWING

FIG. 1 is a partial section view through a drive device with dual clutch as a coupling device.

DETAILED DESCRIPTION OF THE DRAWING

It is known from the prior art that in a hybrid drive, an additional drive, usually an electric motor generator, is interposed between the internal combustion engine and the main gear mechanism, which is usually configured as a dual-clutch transmission or an automatic transmission in the planetary gear design; this additional drive system is also known as "P1 architecture". This additionally interposed electric machine (electric motor generator) may be either an electric machine coaxial to the crankshaft or an electric machine which is axially parallel and radially offset relative to the crankshaft of the internal combustion engine, with a belt, chain or gear wheel output. The width of such a drive adds to the entire axial width of the drive, i.e. the extent in the direction of the rotational axis of the crankshaft of the internal combustion engine. It is furthermore known to achieve a hybrid drive in that the electric machine is arranged on the side of the internal combustion engine facing away from the transmission and can act on the crankshaft of the internal combustion engine; this design is known as P0 architecture. In P0 architecture, again the axial width of the drive is increased by the width of the electric drive. Furthermore, arrangements are known which provide a connection of an electric machine downstream of the separating clutch, wherein the separating clutch is designed for selective interruption of the torque transmission from the internal combustion engine to the main gear mechanism, or downstream of the dual clutch or on other shafts of the main gear mechanism or the power train downstream of the main gear mechanism, but such embodiments may have functional disadvantages or lead to an increase in the installation space requirement. In particular, the above-mentioned systems, above all the P0 and P1 arrangements, require additional axial installation space in order to transmit the power of the electric machine to the drive shaft or to a gearbox input shaft.

As explained, in order to bypass these problems, the basic concept of the invention proposes a coaxial arrangement of a belt pulley, chain sprocket or gear wheel on the outer diameter or outer machine element of the existing dual clutch (in the case that the main gear mechanism is configured as a dual-clutch transmission) or existing torque converter (in the case that the main gear mechanism is configured as an automatic transmission in the planetary gear design); the geometric location at which this belt pulley, chain sprocket or gear wheel is arranged is called the power transmission portion. Since, for example, the gear wheel is not arranged next to but on the dual clutch, the axial installation space is not increased by the width of the gear wheel and a compact power transmission from the electric motor generator is possible. In other words, a drive device configured in this fashion, in comparison with known systems, is axially significantly shorter and only slightly or no wider in comparison with a conventional drive or a drive machine with "only" an internal combustion engine.

In FIG. 1, the gear wheel 15 is arranged on the drive part 6 which is configured as an outer plate carrier. The drive part 6, and hence the plate carrier, is part of the coupling device which is designed as a dual clutch 3, and has a radially outer first partial clutch 3a and a radially inner second partial clutch 3b and may be used to actuate a dual-clutch transmission (not shown).

The plate pack of the first partial clutch 3a can be actuated via a first clutch actuator 10, and when the first partial clutch 3a is closed, drive power from the internal combustion engine 1 or from the electric motor generator 2 or from both together can be transmitted from the drive part 6 to the power train connection 7. The second partial clutch 3b has a further plate pack which can be actuated via a second clutch actuator 11, and when the second partial clutch 3b is closed, drive power from the internal combustion engine 1 or from the electric motor generator 2 or from both together can be transmitted via the drive part 6 to the further power train connection 8.

The drive part 6, or the outer plate carrier, is directly coupled to a device for reducing torsional vibrations, known as a DU system 9; or to put it in more detail, the drive part 6 is connected to the secondary side of the DU system, wherein this connection point may be regarded as the internal combustion engine connection 12. This arrangement allows the drive part 6 to be connected directly to the crankshaft 17 of the internal combustion engine 1, but be vibrationally decoupled or largely decoupled therefrom. The drive from the electric motor generator 2, i.e. the electric motor drive, is applied to the same shaft, i.e. the drive part 6, as the drive from the internal combustion engine 1. To transmit the drive power, the electric motor generator 2 has an electric motor shaft 21 which rotates about the electric motor axis 20 during planned operation for power delivery.

In the proposed arrangement, the electric motor generator 2 (electric motor drive) of the hybrid drive is arranged parallel to the rotational axis of the crankshaft (main drive axis 16) of the internal combustion engine 1, and spaced therefrom in the radial direction 19. Said rotational axis, which is also the rotational axis of the drive part 6 during planned operation, is designated the main drive axis 16. It is proposed to locate the electric motor generator 2 in the upper region of the transmission casing 4 of the dual-clutch transmission or automatic transmission. Here, the portion of the transmission casing 4 shown in the FIGURE is a bearing cover of the dual-clutch transmission. The dual clutch 3 is mounted in the transmission casing 4 via the dual-clutch bearing 5.

The electric motor generator 2 drives the electric motor pinion 14, which, for transmission of the drive power, meshes with the gear wheel 15 on the drive part 6, designed as a plate carrier, wherein the active toothing width of this gear wheel 15 thus forms the electric motor generator connection 13. The combination of the electric motor pinion 14 and gear wheel 15 provides a speed reduction translation ratio.

In contrast to a known conventional drive (only internal combustion engine provided as a drive machine), a slight increase in installation space in the longitudinal direction 18 may be required for reinforcing the original bearing of the components. It may furthermore be provided to replace an existing radial roller bearing of the dual clutch in the transmission casing by a possibly larger deep-groove ball bearing.

LIST OF REFERENCE SIGNS

1 Internal combustion engine
2 Electric motor generator
3 Dual clutch
3a First partial clutch
3b Second partial clutch
4 Transmission casing
5 Bearing of dual clutch
6 Drive part
7 Power train connection
8 Further power train connection
9 DU system
10 First clutch actuator
11 Second clutch actuator
12 Internal combustion engine connection
13 Electric motor generator connection
14 Electric motor pinion
15 Gear wheel
16 Main drive axis
17 Crankshaft
18 Longitudinal direction
19 Radial direction
20 Electric motor axis
21 Electric motor shaft

What is claimed is:
1. A drive device, comprising:
an internal combustion engine connection which is configured for receiving drive power from an internal combustion engine;

an electric motor generator connection which is configured for receiving drive power from an electric motor generator;

a coupling device that couples both the internal combustion engine connection and the electric motor generator connection to at least one power train connection which delivers drive power to a power train, wherein the coupling device has a radially outer drive part and a coupling portion which lies radially inside the drive part and is configured for selectively connecting the drive part to the at least one power train connection in a rotationally fixed fashion, wherein a power transmission portion is arranged on an outer circumferential surface on the radially outer drive part and is configured for receiving drive power from the electric motor generator, wherein both the internal combustion engine connection and the electric motor generator connection are arranged concentrically to a main drive axis, wherein the power transmission portion at least partially or completely covers the coupling portion in a longitudinal direction of the main drive axis, wherein an electric motor axis, about which an electric motor shaft rotates which is configured for delivering drive power from the electric motor generator, is arranged axially parallel to and radially spaced from the main drive axis, wherein the coupling device is a dual clutch and has a radially outer first partial clutch and a second partial clutch arranged radially inside the first partial clutch, wherein the first partial clutch is configured for selectively connecting the drive part to said power train connection in a rotationally fixed fashion, and wherein the second partial clutch is configured for selectively connecting the drive part to a further power train connection in a rotationally fixed fashion.

2. The drive device according to claim 1, wherein the first partial clutch partially or completely covers the second partial clutch in the longitudinal direction of the main drive axis.

3. The drive device according to claim 1, wherein the power transmission portion is configured as or comprises a gear wheel and meshes with an electric motor pinion for receiving power from the electric motor generator.

4. The drive device according to claim 1, wherein the power transmission portion is configured as or comprises a traction device wheel, and an endless traction device transmits the drive power to said traction device wheel for receiving power from the electric motor generator.

5. The drive device according to claim 4, wherein the traction device wheel is configured as a chain sprocket and the endless traction device as a chain.

6. The drive device according to claim 4, wherein the traction device wheel is configured as a belt pulley and the endless traction device as a belt.

* * * * *